United States Patent
Lee et al.

(10) Patent No.: US 9,535,722 B2
(45) Date of Patent: Jan. 3, 2017

(54) METHOD AND SYSTEM FOR COMMUNICATING BETWEEN A HOST DEVICE AND A USER DEVICE THROUGH AN INTERMEDIATE DEVICE USING A COMPOSITE GRAPHICS SIGNAL

(75) Inventors: Sean S. Lee, Potomac, MD (US); Scott D. Casavant, Germantown, MD (US); Phillip T. Wang, Rockville, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/612,367

(22) Filed: Sep. 12, 2012

(65) Prior Publication Data
US 2014/0075485 A1    Mar. 13, 2014

(51) Int. Cl.
*G06F 9/44* (2006.01)
*H04N 21/422* (2011.01)
(Continued)

(52) U.S. Cl.
CPC ...... *G06F 9/4445* (2013.01); *H04N 21/42204* (2013.01); *H04N 21/47202* (2013.01);
(Continued)

(58) Field of Classification Search
CPC ...... G06F 3/147; G06F 3/0659; H04L 69/329; H04N 5/445; H04N 21/45; H04N 19/423; H04N 21/42653; H04N 19/23; H04N 19/42; G09G 5/00; G09G 5/001; G09G 5/12; G09G 5/363; G09G 2360/02; G09G 2360/126; G09G 2360/128; G09G 2340/10; G09G 5/393; G09G 5/397; G06T 1/20; G06T 1/60; A63F 13/00; A63F 2300/203
(Continued)

(56) References Cited

U.S. PATENT DOCUMENTS 6,064,420 A * 5/2000 Harrison et al. ............... 725/136
6,247,048 B1   6/2001 Greer et al.
(Continued)

FOREIGN PATENT DOCUMENTS

| WO | 2007/092953 A2 | 8/2007 |
| WO | 2009/008578 A1 | 1/2009 |
| WO | 2009/137498 A1 | 11/2009 |

OTHER PUBLICATIONS

Baratto, Ricardo A.; "THINC: A Virtual and Remote Display Architecture for Desktop Computing and Mobile Devices"; Ph. D. Thesis; Dec. 31, 2011 (Dec. 31, 2011); pp. 1-67; XP002716050; New York; Chapter I-Introduction, Section 2.4 to 2.6.
(Continued)

*Primary Examiner* — Benjamin R Bruckart
*Assistant Examiner* — Jen-Shi Huang
(74) *Attorney, Agent, or Firm* — Harness, Dickey & Pierce, PLC (57) ABSTRACT

A system and method includes a host device, an intermediate device and a user device. A network is in communication with the host device, the intermediate device and the user device. The host device communicates a first graphics command and a second graphics command to the intermediate device. The intermediate device composites the first graphics command and the second graphics command to form a composite graphics command and communicating the composite graphics command to the user device. The user device generates a screen display in response to the composite graphics command.

23 Claims, 11 Drawing Sheets

(51) Int. Cl.
- *H04N 21/472* (2011.01)
- *H04N 21/6377* (2011.01)
- *H04N 21/658* (2011.01)
- *H04N 21/6587* (2011.01)

(52) U.S. Cl.
CPC ... *H04N 21/47217* (2013.01); *H04N 21/6377* (2013.01); *H04N 21/6581* (2013.01); *H04N 21/6587* (2013.01)

(58) Field of Classification Search
USPC .................................. 725/63–72, 54, 56
See application file for complete search history.

(56) References Cited

U.S. PATENT DOCUMENTS

| | | | |
|---|---|---|---|
| 6,253,326 B1 | 6/2001 | Lincke et al. | |
| 6,345,307 B1 | 2/2002 | Booth | |
| 6,847,366 B2 * | 1/2005 | Walls ................. | G06F 15/8053 345/505 |
| 7,970,857 B2 | 6/2011 | Schneider | |
| 8,219,699 B2 | 7/2012 | Lange et al. | |
| 8,681,203 B1 | 3/2014 | Yin et al. | |
| 2002/0171765 A1 * | 11/2002 | Waki et al. ................. 348/589 | |
| 2002/0188956 A1 | 12/2002 | Ficco et al. | |
| 2002/0199199 A1 * | 12/2002 | Rodriguez ................. 725/95 | |
| 2003/0080963 A1 * | 5/2003 | Van Hook ............... | A63F 13/00 345/501 |
| 2003/0164834 A1 * | 9/2003 | Lefebvre ................. | G06T 1/20 345/506 |
| 2003/0206174 A1 * | 11/2003 | MacInnis ................. | G06T 9/00 345/560 |
| 2005/0076361 A1 * | 4/2005 | Choi et al. ..................... 725/45 | |
| 2006/0125831 A1 * | 6/2006 | Lee ........................... | G06F 3/14 345/501 |
| 2006/0149746 A1 | 7/2006 | Bansod et al. | |
| 2006/0227141 A1 * | 10/2006 | Hogle ............................ 345/473 | |
| 2006/0230428 A1 * | 10/2006 | Craig ..................... | A63F 13/12 725/133 |
| 2007/0006250 A1 * | 1/2007 | Croy et al. ........................ 725/9 | |
| 2007/0120874 A1 * | 5/2007 | MacInnis ............... | G09G 5/001 345/634 |
| 2007/0165043 A1 * | 7/2007 | Fouladi et al. ............... 345/558 | |
| 2008/0107133 A1 | 5/2008 | Lee | |
| 2008/0281798 A1 | 11/2008 | Chatterjee et al. | |
| 2008/0313291 A1 | 12/2008 | Kazmi | |
| 2009/0059909 A1 | 3/2009 | Sullivan | |
| 2009/0182844 A1 | 7/2009 | Barton et al. | |
| 2009/0189894 A1 * | 7/2009 | Petrov et al. ................. 345/419 | |
| 2009/0234971 A1 | 9/2009 | Jethanandani et al. | |
| 2009/0305789 A1 | 12/2009 | Patil | |
| 2010/0281537 A1 | 11/2010 | Wang et al. | |
| 2010/0299701 A1 | 11/2010 | Liu et al. | |
| 2011/0029593 A1 | 2/2011 | Howard et al. | |
| 2011/0145593 A1 | 6/2011 | Auradkar et al. | |
| 2011/0175923 A1 | 7/2011 | Mahajan et al. | |
| 2011/0208838 A1 | 8/2011 | Thomas et al. | |
| 2011/0302499 A1 | 12/2011 | Chou et al. | |
| 2012/0075531 A1 | 3/2012 | Carroll et al. | |
| 2012/0117145 A1 | 5/2012 | Clift et al. | |
| 2012/0127516 A1 | 5/2012 | Chen et al. | |
| 2012/0131139 A1 | 5/2012 | Siripurapu et al. | |
| 2012/0151528 A1 | 6/2012 | Mathews et al. | |
| 2012/0158472 A1 | 6/2012 | Singh et al. | |
| 2012/0167133 A1 * | 6/2012 | Carroll ............... | G06Q 30/0251 725/32 |
| 2012/0192230 A1 | 7/2012 | Algie et al. | |
| 2012/0254450 A1 | 10/2012 | Lejeune et al. | |
| 2012/0254453 A1 | 10/2012 | Lejeune et al. | |
| 2012/0278504 A1 | 11/2012 | Ang et al. | |
| 2013/0335443 A1 * | 12/2013 | Harper ................... | G06F 3/038 345/629 |

OTHER PUBLICATIONS

The RVU Alliance; "RVU Protocol: Network Entertainment With Pixel Accurate Remote Graphics"; Oct. 30, 2011 (Oct. 30, 2011); XP002716066; retrieved from the Internet: URL:http://www.rvualliance.org/files/static_page_files/RVU_White_Paper.pdf; [retrieved on Nov. 7, 2013]; the whole document.
International Search Report and Written Opinion dated Nov. 22, 2013 in International Application No. PCT/US2013/058443 filed Sep. 6, 2013 by Sean S. Lee et al.
Shapiro, Edmond; "Architecting the Media Gateway for the Cable Home"; NDS Technical Paper; 2011; pp. 1-17.
UPnP; "UPnP Device Architecture 1.0"; published Oct. 15, 2008; 80 pages.

\* cited by examiner

METHOD AND SYSTEM FOR COMMUNICATING BETWEEN A HOST DEVICE AND A USER DEVICE THROUGH AN INTERMEDIATE DEVICE USING A COMPOSITE GRAPHICS SIGNAL

TECHNICAL FIELD

The present disclosure relates generally to a communication system for communicating content to a user device, and, more specifically, to a method and system for communicating content to the user device through an intermediate device using a composite graphics signal.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Electronic devices are increasingly accessing the Internet. In the newest flat panel televisions, Internet connections are provided to enhance the customer experience. For example, various Internet sources such as movie sources and data sources such as weather data and stock data may all be obtained directly from the Internet-connected device.

Because each electronic device receives the signals and also processes the signals, the customer experiences at each of the electronic devices may be slightly different. Consistency and the quality that the customer perceives at each device are important for providing a consistent customer experience.

SUMMARY

The present disclosure provides a method and system for intercommunicating between a client device and a host or server device through an intermediate device by compositing on-screen and video signals.

In one aspect of the disclosure, a system includes a host device, an intermediate device and a user device. A network is in communication with the host device, the intermediate device and the user device. The host device communicates a first graphics command and a second graphics command to the intermediate device. The intermediate device composites the first graphics command and the second graphics command to form a composite graphics command and communicating the composite graphics command to the user device. The user device generates a screen display in response to the composite graphics command.

In a further aspect of the disclosure, a method includes communicating a first graphics command and a second graphics command from a host device to an intermediate device, compositing the first graphics command and the second graphics command to form a composite graphics command in the intermediate device, communicating the composite graphics command to a user device and generating a screen display at the user device in response to the composite graphics command.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Figure 1:
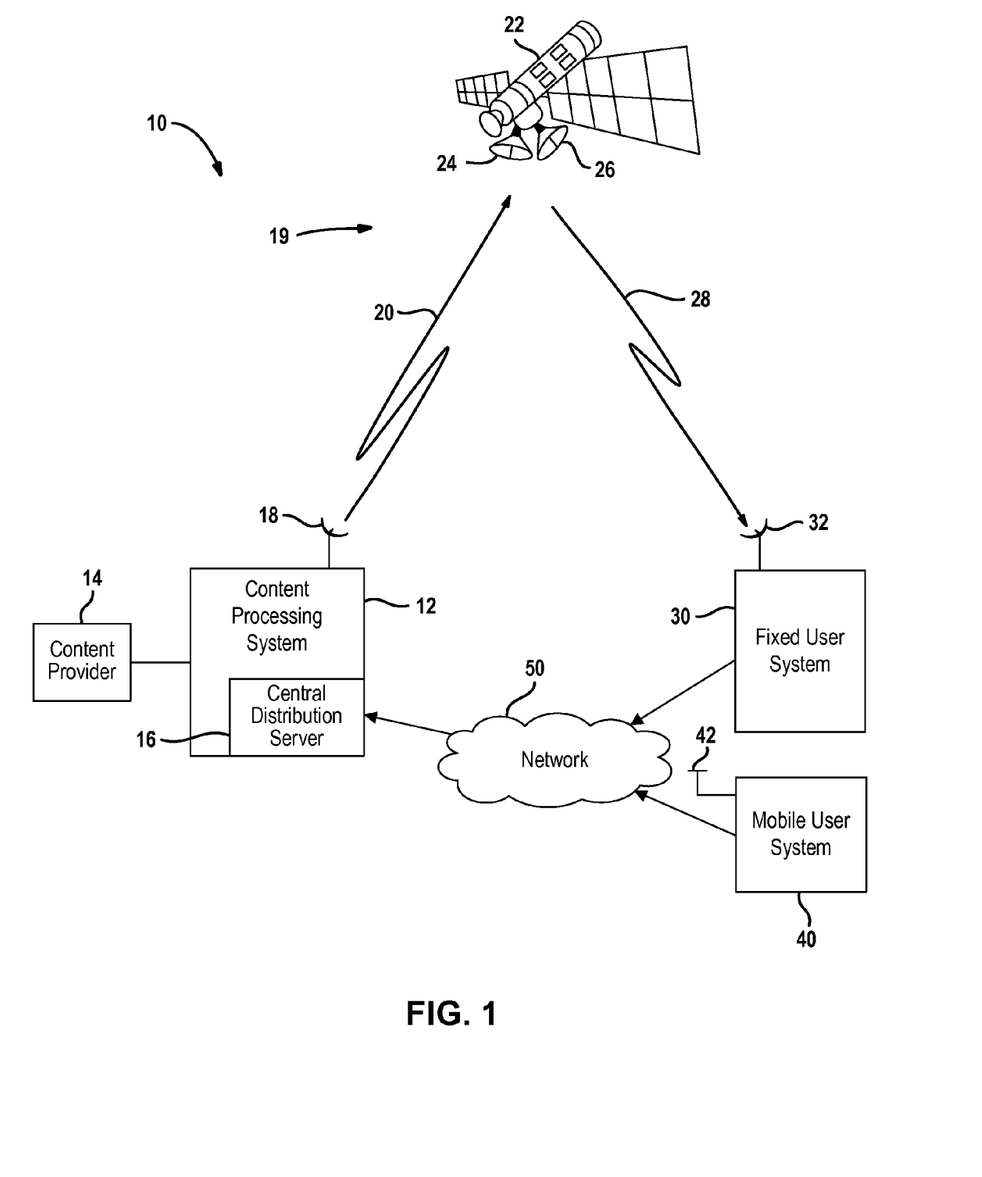
FIG. 1 is a high level block diagrammatic view of a satellite distribution system according to the present disclosure.

Referring now to FIG. 1, a communication system 10 is illustrated. Communication system 10 includes a content processing system 12 that is used as a processing and transmission source. A plurality of content providers 14, only one of which illustrated, may provide content to the content processing system 12. The content processing system 12 receives various types of content from the content provider 14 and communicates the content to system users. The content processing system 12 may also be associated with a central distribution server 16. The central distribution server 16 may be incorporated into the content processing system 12 or may be a separate item. The central distribution server 16 may be used for various types of distribution functions including providing content, providing control commands such as resetting a user device, providing a software image or providing an updated software image to a user system. Other uses of the central distribution server 16 will be described below.

The content processing system 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. The fixed user system 30 may be a set top box, game console or the television itself which has been modified to communicate through a network. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. Different networks may have different speeds or bit rates. The network 50 may, for example, be a broadband wired network or wireless network. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40.

Figure 2:
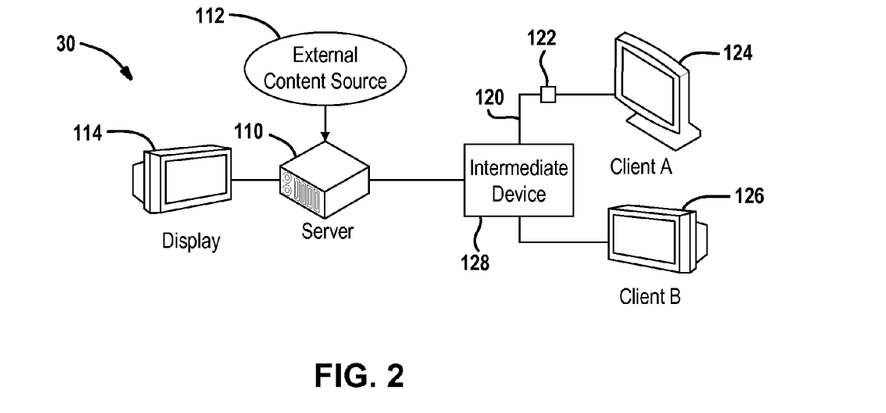
FIG. 2 is a block diagrammatic view of a first network topology.

Referring now to FIG. 2, an example of a fixed user system 30 is illustrated in further detail. The fixed user system 30 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1 and the server 110 may be a satellite television set top box (with server capabilities) receiving satellite television video signals. The external source 112 may be a variety of television signal sources such as an over-the-air tuner, a cable, a wireless system, or an optical system. Various types of signals such as data, music, video, games, audio, and combinations thereof may be part of the external source.

The host or server device 110 may act as a set top box for directly communicating content to a display 114. The content in a direct connection may not be renderable content but rather directly displayable signals within a frequency band. The signals to display 114 may also be renderable. The display 114 may be a television or monitor.

The server 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both clients A and B as well as acts as an intermediary if client A communicates with Client B, or vice versa.

The host or server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server or intermediate device for displaying the rendered signals on a display 124 associated with the client device 122. The client device 122 may also select the content and controls from the user interface and communicate the control signals to the server device 110.

A second client, Client B, may also be in communication with the server 110 through the local area network 120. Client B may contain an internal client device, not shown, for displaying rendered signals on the display 126. The internal client device may be functionally equivalent to the standalone client device 122. Because both the first client, Client A, the second client, Client B and the intermediate device 128 are in communication with the server 110, the network 120 may be referred to as a closed network. Various numbers of clients may be connected to the local area network 120.

An intermediate device 128 may be disposed within the local area network 120. The intermediate device 128 is in communication with the server 110 and at least one of the clients 122, 126. The intermediate device may also overlay a screen display onto the video to form a composite signal which is provided to one of the client devices 122, 126. The intermediate device 128 may also act as a bridge device for converting signals into different formats. The intermediate device 128 may also be used to perform various functions. The functions will be further described below with respect to the detailed figures of the intermediate device.

Figure 3:
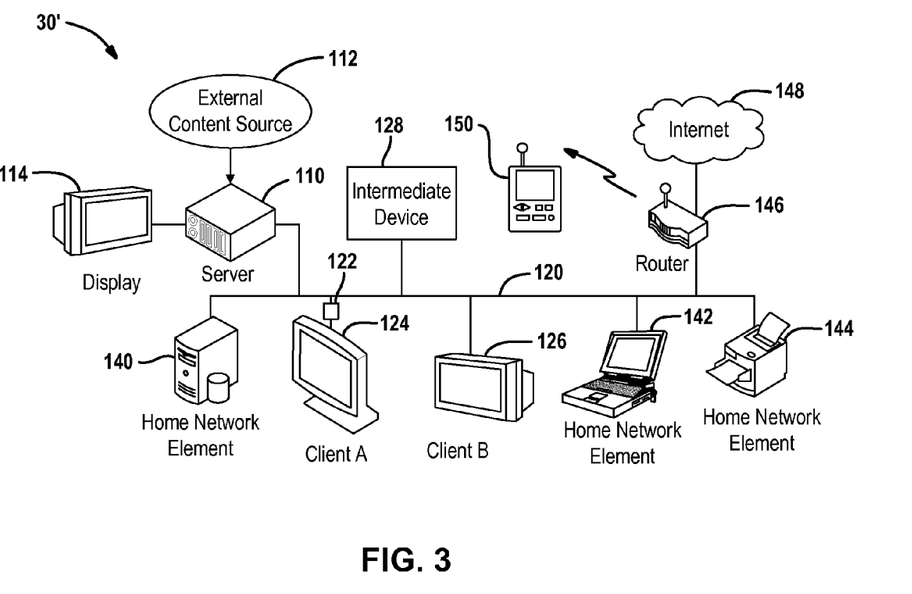
FIG. 3 is a block diagrammatic view of a second example of the network topology.

Referring now to FIG. 3, a user system 30' which is an open network is illustrated. In this example, the same components described above in FIG. 2 are provided with the same reference numerals. In this example, the local area network 120 may include a number of home network elements. One home network element may be a home network server 140 or other computing device. Another home network element may include a laptop computer 142 that is in communication with the local area network 120. Another home network element may include a network printer 144 and a router 146. The router 146 may communicate with other devices through an external network such as the Internet 148.

The fixed user system 30 may also have wireless elements associated therewith. The router 146 or another network device may generate wireless signals that allow a wireless user device 150 to communicate with at least one server 110 or 140. The wireless user device 150 may, for example, be a personal digital assistant, a cellular phone, a personal media device or a Blu-Ray or DVD player. Of course, other wireless devices may be part of the network 120. The wireless user device 150 may also communicate with the local area network 120 through the internet 148 thus the system 30' is not limited to a local system.

Figure 4:
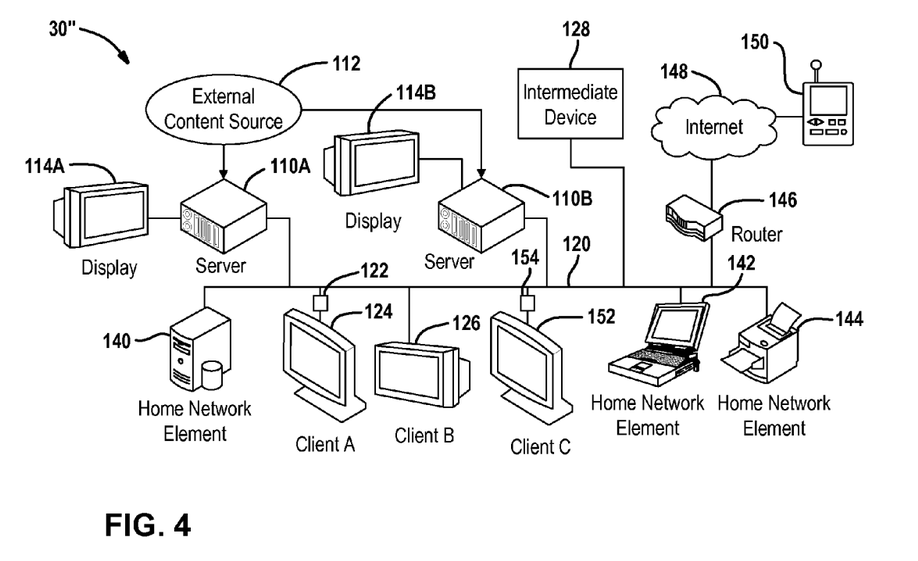
FIG. 4 is a block diagrammatic view of a third example of a network topology.

Referring now to FIG. 4, another example of a user system 30" is illustrated. In this example, the same elements from FIGS. 2 and 3 are provided with the same reference numerals. The local area network 120 may also include two servers 110A and 110B. Each server may include an optional display device 114A, 114B, respectively. In this example a third client, Client C, is illustrated having a display 152 and a client device 154. The wireless user device 150 is illustrated communicating through the Internet 148 and router 146 to the local area network 120. As mentioned above, the router 146 may directly communicate with the user device 150.

Figure 5:
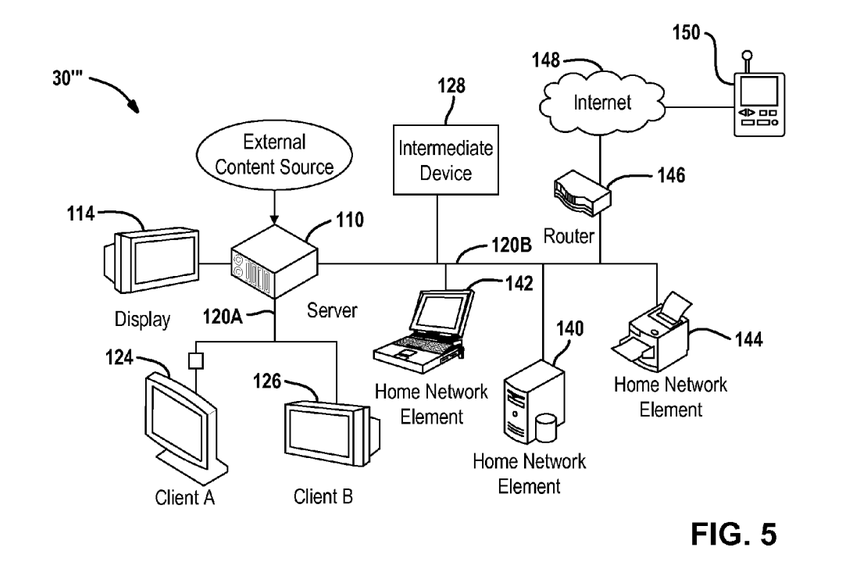
FIG. 5 is a block diagrammatic view of a fourth example of a network topology.

Referring now to FIG. 5, providing customers with reliable service is important. A fourth example of the fixed user system 30''' is illustrated. In certain cases, a home network may not be as reliable as a direct connection. In FIG. 5, the local area network is divided into a first local area network 120A between the first client, Client A, the second client, Client B, and the server 110. That is, the server 110 communicates through the first local area network 120A with both Client A and Client B and any other clients that may be on the system. A second local area network 120B may communicate with other devices within the home network such as the server 140, the laptop computer 142, the printer 144 and the router 146.

Figure 6:
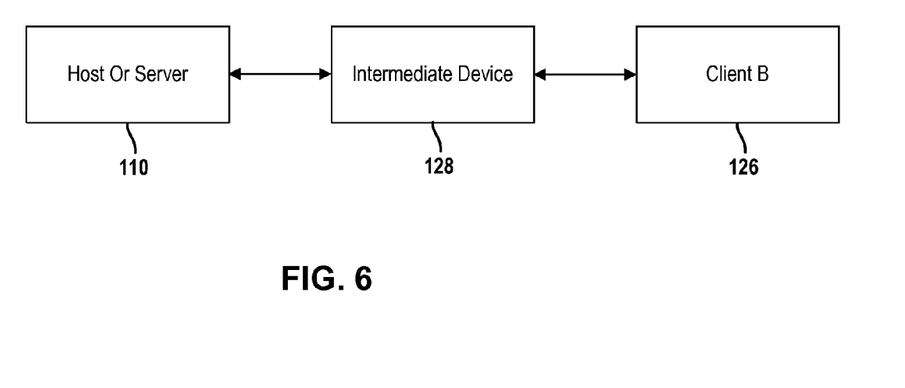
FIG. 6 is a block diagrammatic view of a fifth example of a network.

Referring now to FIG. 6, a simplified block diagrammatic view of an intermediate device 128 in communication with a host or server 110 and a client 126 is illustrated. In this example, client B 126 may be configured to transmit and receive signals in a second format different from the first format associated with the host or server. All signals passing between the host or server 110 and the client B may be communicated through the intermediate device 128 which acts as a transcoder. The intermediate device 128 may provide video signals having graphics superimposed thereon for display by the client B. Interaction signals, such as command signals, may be communicated from the client B and transmitted to the first format by the intermediate device 128.

Figure 7:
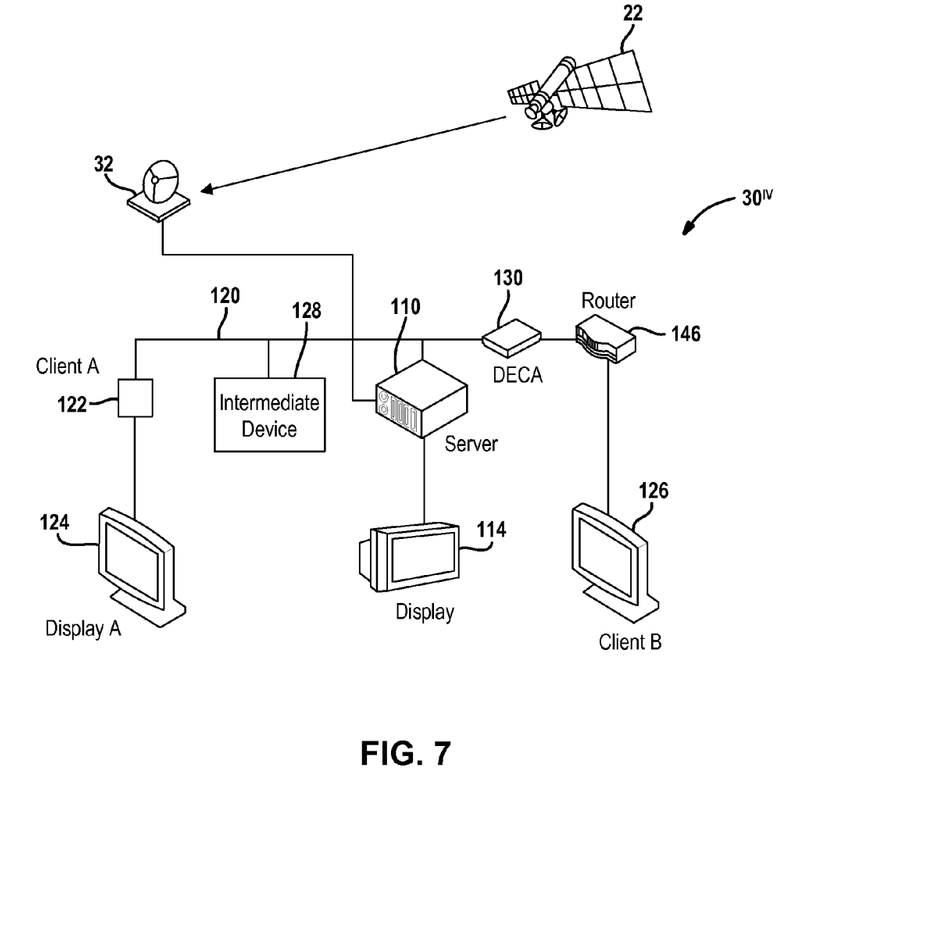
FIG. 7 is a block diagrammatic view of a sixth example of a network.

Referring now to FIG. 7, a user system $30^{IV}$ is set forth having an intermediate device 128 that acts as a bridge device that allows a first format server 110 to communicate with a first format client 126. In one example, the server communicates using RVU commands and the client 126 receives RVU commands. This example also illustrates the antenna 32 in communication with the local area network 120.

A DIRECTV® Ethernet coaxial adapter (DECA) 130 is illustrated. The adapter 130 allows signals within a coaxial cable to be in connection with an Ethernet network connection. In this example, the client 126 may be in communication with the router 146 which, in turn, is in communication with the adapter 130. Thus, the client 126 may be adapted to receive Ethernet signals.

Figure 8:
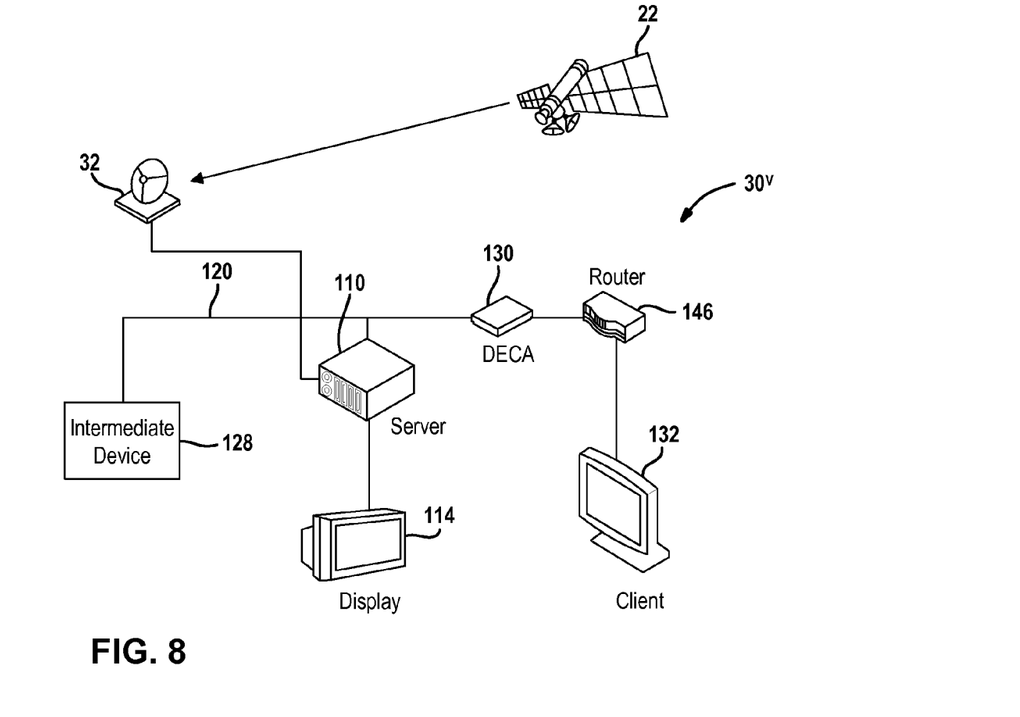
FIG. 8 is a block diagrammatic view of a seventh example of a network topology.

Referring now to FIG. 8, in another system, the server 110 uses a first format to communicate various command and content signals while a non-first format client 132 is in communication with the router 146. The intermediate device 128 acts as a bridge device that allows the non-first format client 132 to communicate with the server 110 by converting the commands therebetween. The adapter 130 is also in communication between the server 110 and the non-first format client 132.

Figure 9:
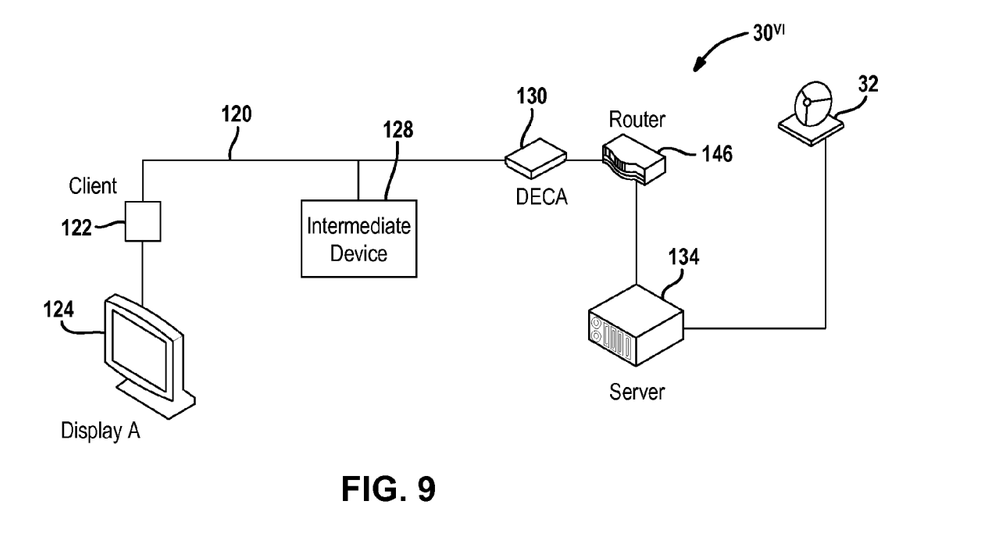
FIG. 9 is an eighth example of a network topology.

Referring now to FIG. 9, another user system $30^{VI}$ is illustrated. In this example, a first format server 134 is in communication with a second format client device 122 using the intermediate device 128 to communicate therebetween. The intermediate device 128, in this case, performs the operation of converting non-first (second) format graphics commands to the first format user interface graphic commands that are understood by the client device 122. The intermediate device 128 may also convert audio and video data into a suitable format for use by the client device 122.

Figure 10:
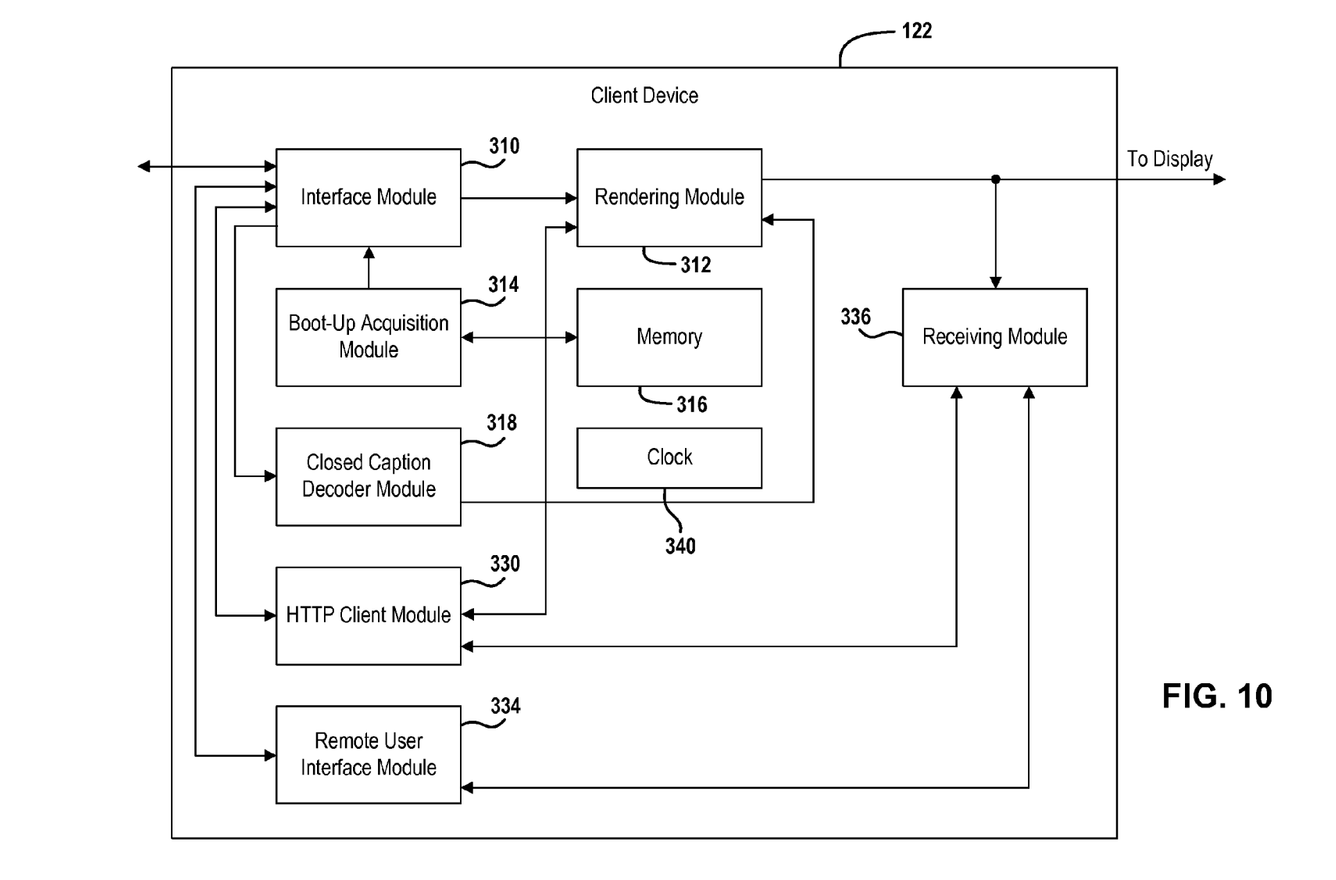
FIG. 10 is a block diagrammatic view of a client device.

Referring now to FIG. 10, a client device 122 is illustrated in further detail. The client device 122 may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate between a local area network and the server 110 illustrated in FIGS. 2-9. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the network 120 (of FIG. 9) and the client device 122. As mentioned above, the client device 122 may be integrated within various types of devices or may be a standalone device. The interface module 310 may receive signals from the network such as graphics commands, optimized graphics commands, renderable video signals and the like. The interface module 310 may also communicate playback request signals and other request signals to the network. The client device may include a rendering module 312. The rendering module 312 receives formatted signals through the local area network that are to be displayed on the display. The rendering module 312 merely places pixels in locations as instructed by the command signals. The rendering module 312 will allow consistent customer experiences at various client devices. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a user device identifier signal corresponding to the user device type. The user device identifier includes but is not limited to a display resolution, a make identifier, a model identifier, an operating system identifier, a hardware revision identifier, a major software revision, and a minor software revision identifier. Also, a download location for the server to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning may be overlayed upon the rendered signals from the rendering module 312 when displayed upon the display associated with the client device.

Communications may take place using HTTP client module 330. The HTTP client module 330 may provide formatted HTTP signals to and from the interface module 310.

A remote user interface module 334 allows clients associated with the media server to communicate remote control commands and status to the server. The remote user interface module 334 may be in communication with the receiving module 336. The receiving module 336 may receive the signals from a remote control associated with the display and convert them to a form usable by the remote user interface module 334. The remote user interface module 334 allows the server to send graphics and audio and video to provide a full featured user interface within the client. Screen displays may be generated based on the signals from the server. Thus, the remote user interface module 334 may also receive data through the interface module 310. It should be noted that modules such as the rendering module 312 and the remote user interface module 334 may communicate and render both audio and visual signals.

A clock 340 may communicate with various devices within the system so that the signals and the communications between the server and client are synchronized and controlled.

The composite output video signal 370 of the transcoder 364 allows the client device to be simplified since a video decoder and audio decoder are all that is needed to display the signals.

A format converter 372 may also be included within the intermediate device 128. The converter converts a command or request signal from a client device that is in a second format to a first format suitable for processing at the server or host device. In the present example, the first format may be an RVU format.

Figure 11A:
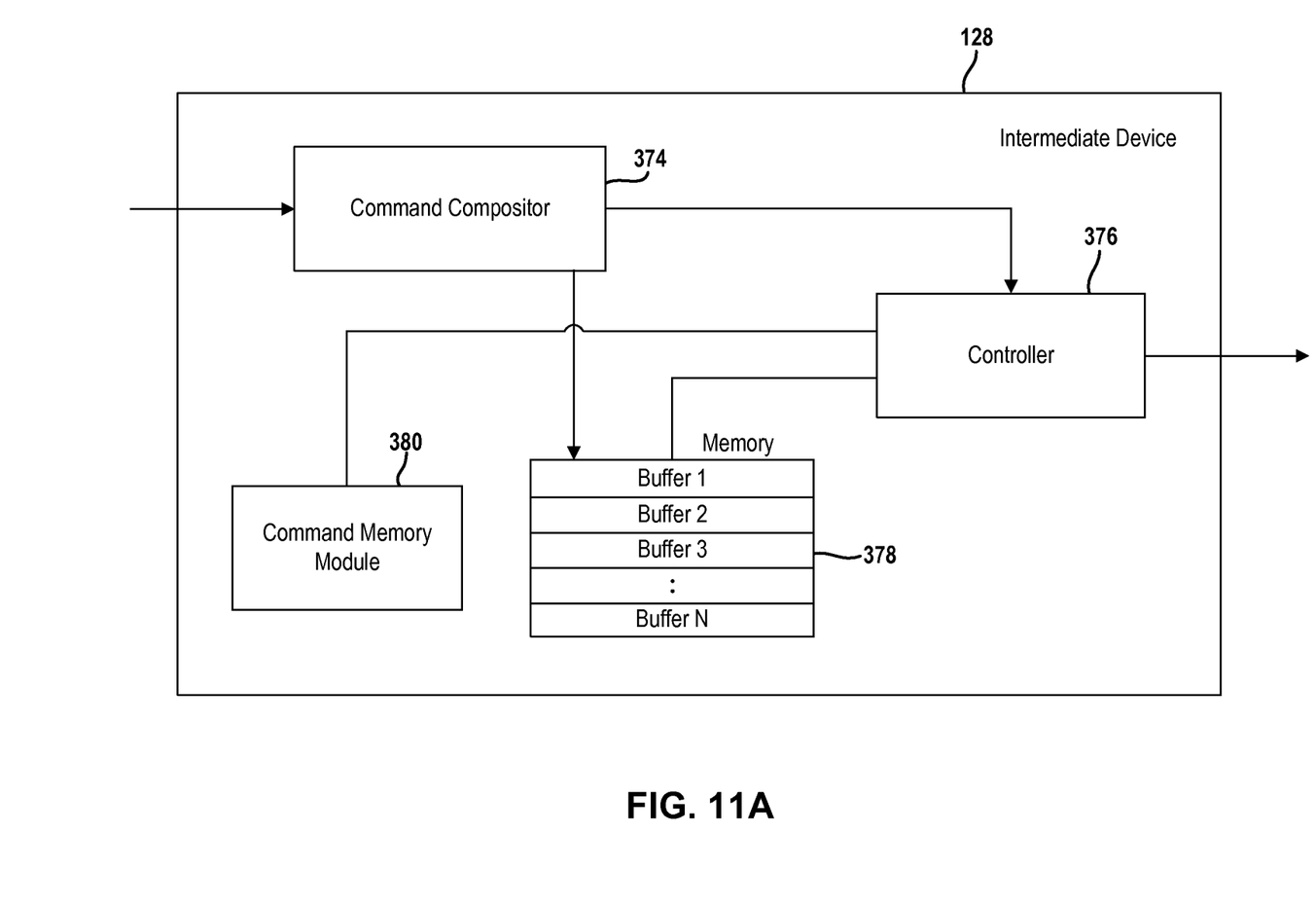
FIG. 11A is a block diagrammatic view of an intermediate device.

Referring now to FIG. 11A, an example of an intermediate device 128 is illustrated. This example illustrates the capability of the intermediate device 128 to composite multiple operations and thus provide one resultant composite graphics signal to buffer to a client device. In this example, a graphics command compositor 374 receives signals from a server. A controller 376 communicates signals to the memory 378 having various buffers, buffer 1, buffer 2, buffer 3 . . . buffer N. A command memory module 380 is in communication with the controller 376. The command memory module 380 allows the intermediate device 128 to optimize commands. This takes place in both directions from a server or host device in which the intermediate device 128 optimizes the signals and the commands into signals and commands better suited for being received and operated on at the receiving device. Likewise, the client device provides signals which are converted into a first format using the command memory module 380 as a source to link the different commands to suitable commands processing at the server.

Figure 11B:
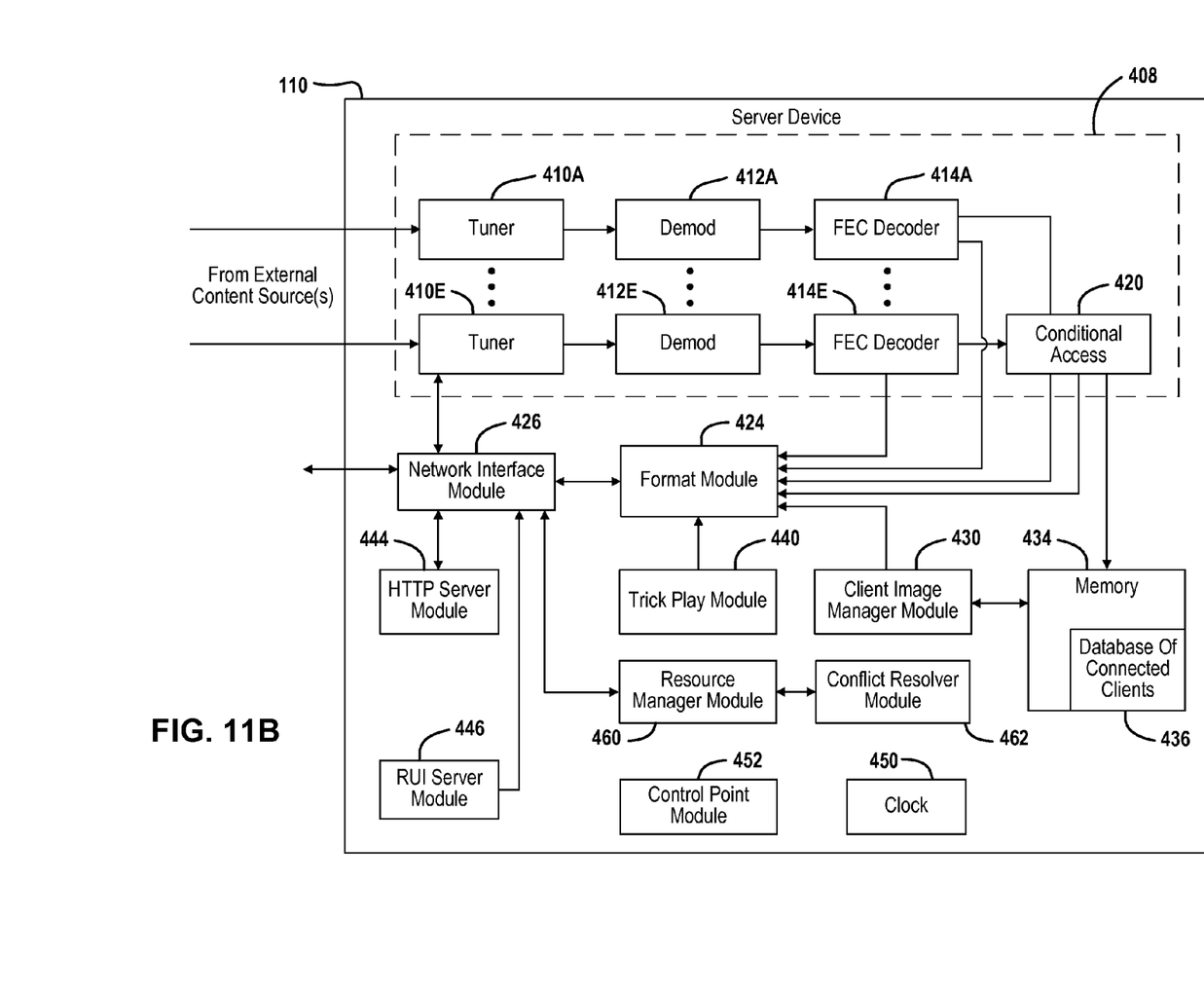
FIG. 11B is a block diagrammatic view of a server device.

Referring now to FIG. 11B, a server 110 is illustrated in further detail. The server 110 is used for communicating with various client devices 122. The server 110, as mentioned above, may also be used for communicating directly with a display. The server 110 may be a standalone device or may be provided within another device. For example, the server 110 may be provided within or incorporated with a standard set top box. The server 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a plurality of tuners 410A-E, a plurality of demodulators 412A-E, a plurality of forward error correction decoders 414A-e and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate commands to control pixels at different locations of the display. The network interface module 426 may also be used for receiving signals from a client device or devices.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory may also contain other data such as a database of connected clients 436. The database of connected clients may also include the client image manager module data.

A trick play module 440 may also be included within the server device 110. The trick play module 440 may allow the server device 110 to provide renderable formatted signals from the format module 424 in a format to allow trick play signals such as rewinding, forwarding, skipping, and the like. An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used to control and supervise the various functions provided above within the server device.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

The server device 110 may also include a resource manager module 460 that is in communication with a conflict resolver module 462. The resource manager module 460 may be in communication with a network interface module 426. The network interface module 426 may receive signals such as control signals or selection signals from various client devices. The resource manager module 460 may identify when a conflict arises from a conflict-causing request received from one of the client devices.

A conflict may arise when a concurrent view or service activity requires more resources than those available at the server device.

As will be further described below, the resource manager module 460 may generate a set of "sufficient sets." The sufficient sets may be provided to the conflict resolver module 462. The resource manager module 460 or the conflict resolver module 462 may then determine a course of action to follow for the encountered conflict. The conflict resolver module 462 may consider the type of activity generating the conflict-causing request versus the activities in the set of sufficient sets. The conflict resolver module 462 returns sufficient sets sorted according to the requirements of the system. The resource manager module 460 may thus resolve the conflict according to the sufficient sets and prompt the user of a client device for an input, if required. The conflict resolver module 462 may resolve conflicts between various aspects of the operation of the server, including tuner conflicts as will be described below.

Figure 12:
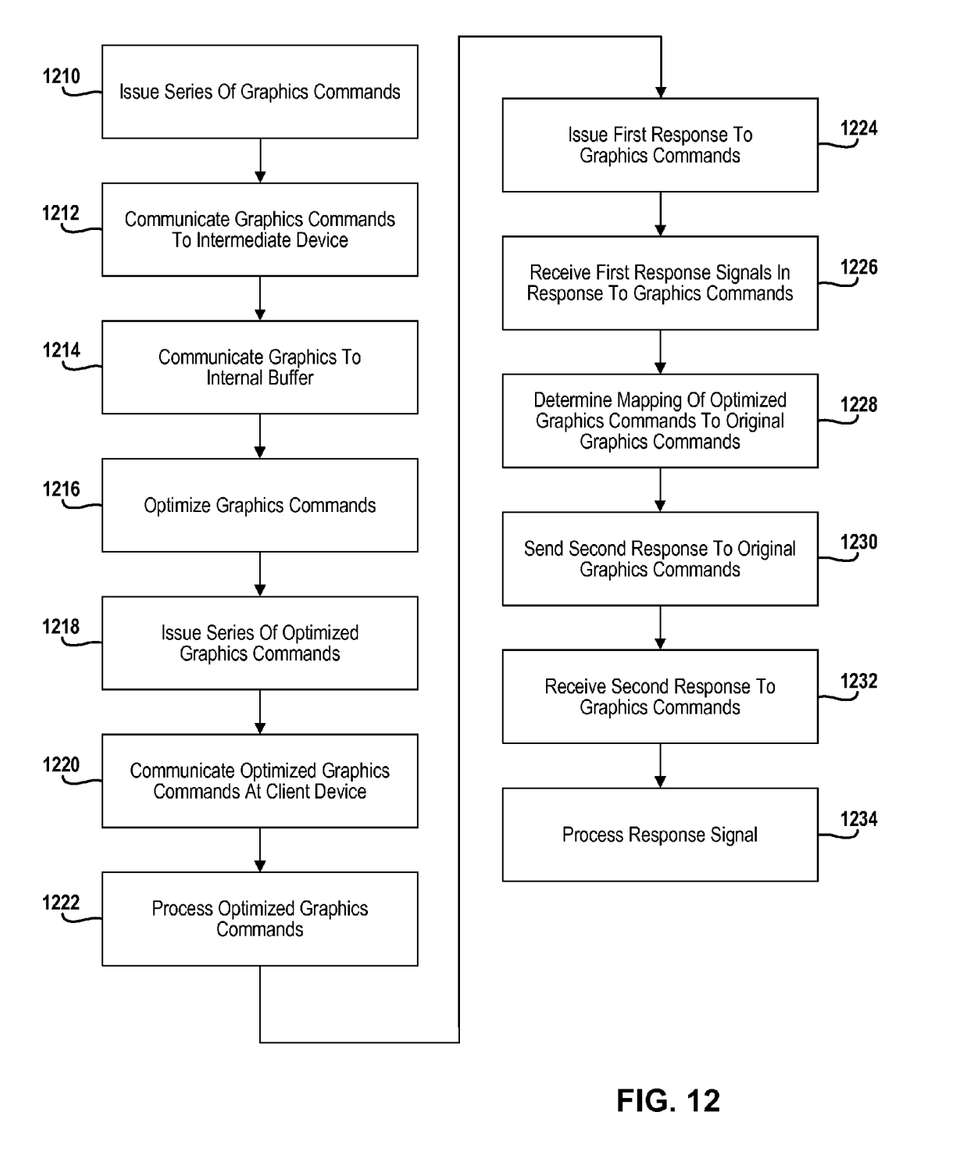
FIG. 12 is a flowchart of a method for command optimization.
Figure 13:
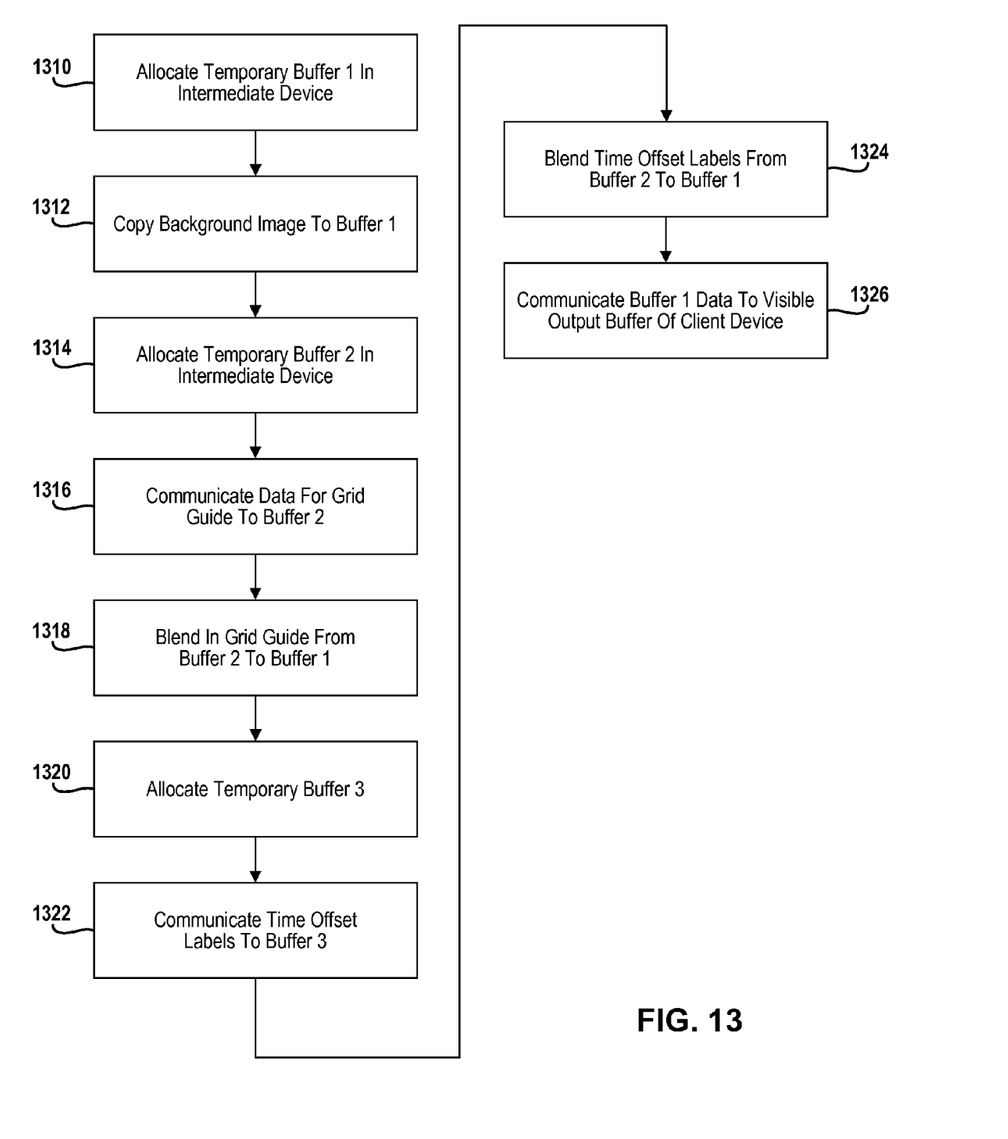
FIG. 13 is a flowchart of a method for implementing steps 1416 and 1418 of FIG. 14.

Referring now to FIG. 12, a method for optimizing commands in set forth. In step 1210, the host device or server that is associated with the first format generates a series of graphic commands. That is, a first graphics commands, a second command, and potentially more graphics commands are generated. In the example of FIG. 13, three graphics commands are used. In step 1212, the graphic commands are communicated to the intermediate device. A first network may be used for communicating the first graphics command. In step 1214, the graphic commands are communicated or composited into an internal buffer. In step 1216, the graphic commands are optimized in the intermediate device. Optimization of the graphics commands may convert the graphics commands to a second graphics command or second set of graphics commands that may be processed more quickly or efficiently at a client device. Optimized graphics commands are issued in step 1216 at the intermediate device. In step 1220, the optimized graphics commands are communicated to a client device. In step 1222, the optimized graphics commands are processed at the client device. In step 1224, first response signals are generated in response to the graphics commands. The first response signals are communicated to the intermediate device where they are received in step 1226. In step 1228, a mapping of the optimized graphics commands to the original graphics commands is performed. Thus, the first response signals are coordinated with the original graphics commands in step 1228. In step 1230, a second response signal or signals are generated at the intermediate device in response. In step 1232, the second response signal is communicated from the intermediate device where it is received at the server. In step 1234, the second response signal is processed which causes an action to be performed at the server or host device. The responses are used to confirm that the original graphics commands were processed correctly by the client device.

Referring now to FIG. 13, steps 1216 and 1218 of FIG. 12 are illustrated in further detail. To optimize or composite the graphics, various buffers may be allocated within the intermediate device. In step 1310, a temporary buffer 1 is allocated in the memory of the intermediate device. In step 1312, a background image is copied to buffer 1. In step 1314, a temporary buffer, buffer 2, is allocated from the memory in the intermediate device.

Steps 1316-1326 are specific examples of types of data. Other types of graphics data may be used. In step 1316, data for a grid guide is communicated to buffer 2. In step 1318, the graphics from buffer 1 and buffer 2 are blended to form blended data. In step 1320, a temporary buffer, buffer 3, is allocated in the intermediate device. In step 1322, a time offset label is communicated to buffer 3. In step 1324, the time offset labels are blended from buffer 3 to buffer 1. In step 1326, the buffer 1 data is communicated to a visual output buffer of a client device through a network between the intermediate device and the client device.

Figure 14:
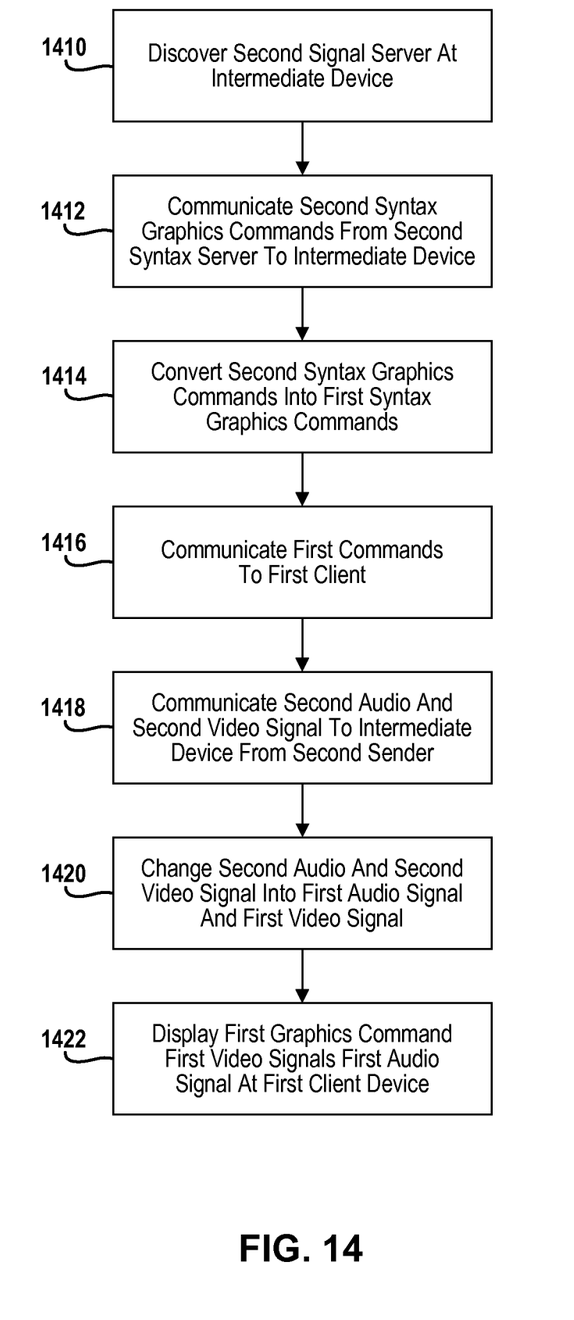
FIG. 14 is a flowchart of a method for communicating graphics commands between two devices.

Referring now to FIG. 14, a method of displaying graphics commands are set forth. In step 1410, a second format server is discovered at the intermediate device. It should be noted that an announcement signal may be communicated from the second format signal for discovery. The intermediate device may also prompt or initiate a response generating a query signal.

In step 1420, a second format graphics command is communicated from a second format server to an intermediate device. The second format server may be an HTML5 browser or another type of server. In step 1414, the intermediate device converts the second format graphics commands into first format graphics commands. In step 1416, the first format commands are communicated to a first format client. The first format client may be an RVU client. In step 1418, the second format audio and second format video signals are also communicated to the intermediate device from the second format server. In step 1420, the second format audio and second format video signals are communicated into a first format audio signal and a first format video signal. In step 1422, the first format graphics command, the first format video signals and the first format audio signal are displayed at the first format client device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
a host device that is directly connected to a network;
an intermediate device, separate from the host device, having a first buffer, a second buffer and a third buffer and being indirectly connected to the network via the host device; and
a user device, separate from the intermediate device and the host device, indirectly connected to the network via the intermediate device;
said host device communicating a first graphics command and a second graphics command to the intermediate device;
said intermediate device storing the first graphics command in a first buffer and the second graphics command in a second buffer, said intermediate device compositing the first graphics command from the first buffer and the second graphics command of the second buffer by blending the first graphics command and the second graphics command to form a composite graphics command in a third buffer, and communicating the composite graphics command from the third buffer to the user device;
said user device generating a screen display in response to the composite graphics command, generating a first response signal in response to the composite graphics command and communicating the first response signal to the intermediate device;
said intermediate device mapping the first response signal with the first graphics command and the second graphics command, generating a second response signal in response thereto and communicating the second response signal to the host device.

2. The system as recited in claim 1 wherein the host device communicates a plurality of graphics commands to the intermediate device.

3. The system as recited in claim 2 wherein said intermediate device blends first data from the first buffer and second data from the second buffer to form blended data based upon one or more properties of the graphics commands, said intermediate device forming the composite graphics command based on the blended data.

4. The system as recited in claim 3 wherein the intermediate device determines which buffers to blend together based upon coordinates that are affected by the graphics commands associated to the buffers.

5. The system as recited in claim 3 wherein the intermediate device determines which buffers to blend together based upon a time property associated with received graphics commands.

6. The system as recited in claim 3 wherein the intermediate device determines which buffers to blend together based upon complexity of the graphics commands associated with the buffers.

7. The system as recited in claim 3 wherein the intermediate device stores the blended data in the first buffer.

8. The system as recited in claim 3 wherein the first graphics command comprises a background image, said second graphics command comprises a grid guide and a third graphics command comprises a time offset.

9. The system as recited in claim 1 wherein the host device communicates using a first format and the user device communicates using a second format different than the first format.

10. The system as recited in claim 1 wherein the host device comprises a server and the user device comprises a set top box.

11. The system as recited in claim 1 wherein the host device comprises a server and the user device comprises a television.

12. The system as recited in claim 1 wherein the host device comprises a server and the user device comprises a game console.

13. The system as recited in claim 1 wherein the host device receives satellite television signals.

14. The system as recited in claim 1 wherein the host device receives terrestrially broadcasted television signals.

15. A method comprising:
communicating a first graphics command and a second graphics command from a host device to an intermediate device, the host device being directly connected to a network, and the intermediate device being indirectly connected to the network via the host device;
storing the first graphics command in a first buffer of the intermediate device;
storing the second graphics command in a second buffer of the intermediate device;
compositing the first graphics command and the second graphics command by blending the first graphics command and the second graphics command to form a composite graphics command and storing the composite graphics command in a third buffer of the intermediate device;
communicating the composite graphics command from the third buffer of the intermediate device to a user device, the user device being indirectly connected to the network via the intermediate device and the host device;
generating a screen display at the user device in response to the composite graphics command;
generating a first response signal in response to the composite graphics command and communicating the first response signal to the intermediate device;
mapping the first response signal with the first graphics command and the second graphics command; and
generating a second response signal in response thereto and communicating the second response signal to the host device.

16. The method as recited in claim 15 further comprising communicating a plurality of graphics commands from the host device to the intermediate device.

17. The method as recited in claim 16 further comprising blending first data from the first buffer and second data from the second buffer to form blended data at the intermediate device based upon one or more properties of the graphics commands, forming the composite graphics command based on the blended data.

18. The method as recited in claim 17 wherein blending comprises blending the first data and the second data in response to coordinates that are affected by the graphics commands.

19. The method as recited in claim 17 wherein blending comprises blending the first data and the second data in response to a time property associated with the first or second graphics commands.

20. The method as recited in claim 17 wherein blending comprises blending the first data and the second data in response to complexity of the graphics commands.

21. The method as recited in claim 17 further comprising storing the blended data in the first buffer.

22. The method as recited in claim 16 wherein the first graphics command comprises a background image, said second graphics command comprises a grid guide and a third graphics command comprises a time offset.

23. The method as recited in claim 15 wherein communicating the composite graphics command to the user device comprises communicating the composite graphics command from the host device using a first format and further comprising communicating a response signal from the user device using a second format different than the first format.

* * * * *